June 9, 1959

G. W. ROBINSON 2,889,619

METHOD OF JOINING TWO PANELS OF AN AUTOMOBILE
TRUNK LID OR DOOR OR THE LIKE BY WELDING

Filed June 17, 1955

INVENTOR.

George W Robinson

BY

Wilson, Redrow, & Sadler

United States Patent Office 2,889,619
Patented June 9, 1959

2,889,619

METHOD OF JOINING TWO PANELS OF AN AUTOMOBILE TRUNK LID OR DOOR OR THE LIKE BY WELDING

George W. Robinson, South Bend, Ind., assignor to Studebaker-Packard Corporation, Detroit, Mich., a corporation of Michigan Application June 17, 1955, Serial No. 516,066

3 Claims. (Cl. 29—475)

This invention relates to a new and improved method for joining two panels of sheet metal by welding. Specifically the invention relates to a new and improved method of joining sheet metal panels in generally parallel, spaced relation without marring or otherwise damaging a smoothly finished surface on one of the panels.

Doors and trunk lids for automobiles in general comprise two sheet metal panels which are arranged in generally parallel and spaced relation. Prior to joining or attaching two panels by welding to form a door or trunk lid one of the panels has a smoothly finished surface which is substantially in condition to be painted or perhaps only requires a minor finishing treatment such as buffing prior to being painted. A prior art difficulty has been that the welding operation by which end portions of the panels are joined together has caused the finished surface of one of the panels to be marred due to the heat of the welding operation which causes burns and pimples to be formed on the finished surface of the panel. It requires a considerable number of man hours in the use of discing machines and in filing and polishing operations to remove the burns and pimples from the finished surface to restore it in a smooth condition so that it may be painted.

It is a main object of the invention to provide a new and improved method for joining two panels of sheet metal in generally parallel, spaced relation without marring or otherwise damaging a smoothly finished surface on one of the panels. It is a further object of the invention to make the new and improved method applicable to the manufacture of automobile doors and trunk lids which comprise two parallel spaced panels.

Other objects of the invention will become apparent from the following specification, the drawings relating thereto, and the appended claims.

Figure 1:
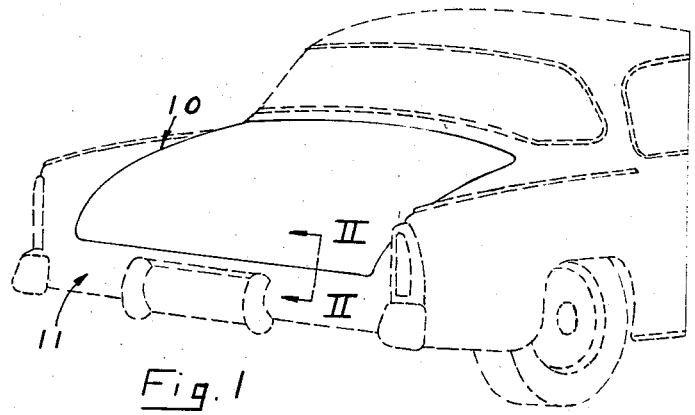
Fig. 1 shows a perspective view of the rear end of an automobile having a hinged trunk lid of the type to which the invention is applicable.

Referring to the drawing, there is shown in Fig. 1 the rear end of an automobile. The invention is illustrated as being applied to a hinged deck lid 10 of the automobile. As will appear hereinafter, however, the invention is also applicable to the doors of an automobile and various other structures.

Figure 2:
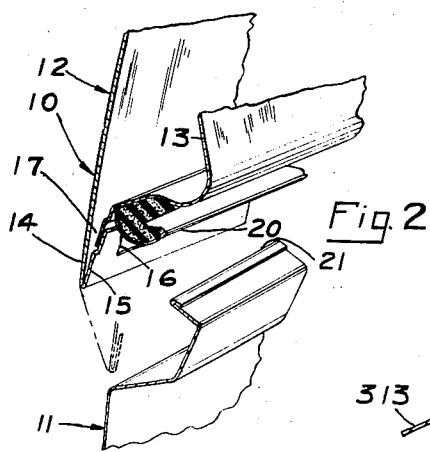
Fig. 2 is a fragmentary isometric sectional view taken on line II—II of Fig. 1 and shows the trailing end of a deck lid, which was fabricated in accordance with the method of the present invention, and the body portion of the automobile with which the deck lid engages when the deck lid is in a closed position.

In Fig. 2 there is shown the rear end or trailing portion of deck lid 10 and the body portion 11 of the automobile with which the trailing portion of the deck lid 10 engages when the deck lid is in a closed position. Deck lid 10 is a substantially rigid structure by reason of it being of double thickness, there being two sheet metal panels 12 and 13 which are attached together and arranged in generally parallel, spaced relation.

Prior to the joining together of panels 12 and 13, the outer surface of panel 12 has a smoothly finished surface. As stated above, it is a main object of the invention that injury to the finished surface of panel 12 be prevented during the particular part of the manufacturing operation which involves the joining together of panels 12 and 13 by welding. In accordance with the invention the end portion of panel 12 is bent or turned inwardly relative to the finished outer surface of panel 12. The bending operation is such that the lower end of panel 12 is generally U-shaped in section with legs 14 and 15 of the U being spaced apart a distance which is just sufficient to permit the insertion of the end portion of sheet metal panel 13 between the legs 14 and 15 of the U. Attached integrally or otherwise to the inner leg 15 of the U-shaped section is at least one tongue 16. Tongue 16 is positioned so that at least a portion thereof is spaced in generally parallel relation to the external portion of panel 12 which adjoins leg 15. Panel 13 and tongue 16 are formed and positioned relative to each other (1) so that an edge portion of panel 13 may be disposed between legs 14 and 15 of panel 12, (2) so that a surface portion of tongue 16 is in abutting engagement with a surface portion of panel 13, and (3) so that the portion of panel 13 which abuts tongue 16 is in spaced relation to the portion of panel 12 which adjoins leg 15. With this construction tongue 16 may be welded to panel 13, as by spot or arc welding, and the heat generated thereby will be substantially dissipated in the space 17 provided for between panels 12 and 13.

The desirable result obtained by having the heat dissipated in the space 17 is that most of the generated heat is thereby prevented from being transmitted to the smoothly finished external surface of panel 12. The marring of the finished surface by burns and pimples, which would otherwise result if the space between panels 12 and 13 were not provided for in accordance with the present invention, is thereby avoided and the main object of the invention is accordingly accomplished.

In the embodiment of the invention shown in Fig. 2, the tongue 16 is illustrated as being short in width and in such case a plurality of such flanges may be provided if desired.

A rubber molding strip 20, bonded to panel 13, is provided which is engageable with a flange 21 formed on the automobile body portion 11 when the deck lid 10 is in a closed position.

Figure 3:
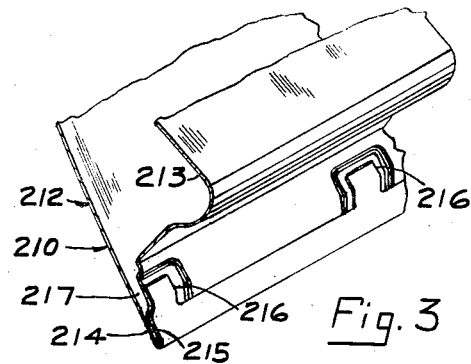
Fig. 3 is a fragmentary isometric sectional view of a deck lid which was fabricated by utilizing a modified form of the method of the present invention.

A modification of the invention illustrated in Fig. 3 is somewhat similar to the embodiment shown in Fig. 2. Reference numerals used for Fig. 3 are in the 200 series. Elements in Fig. 3 have reference numerals for which the last two digits are the same as the reference numerals of generally corresponding elements in Fig. 2. The significant difference in the embodiment of the invention shown in Fig. 3 is that the portions of panel 213 with which tongues 216 are in abutting engagement are recessed to a depth which is equivalent to the thickness of tongues 216. The advantage is that the exposed surfaces of tongues 216 and most of the surface portion of panel 213 disposed between tongues 216 are in the same plane and a rubber weatherstripping molding which would extend across the width of deck lid 210 may therefore be conveniently attached.

Figure 5:
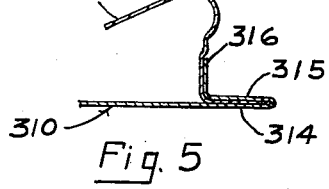
Fig. 5 is a sectional view taken on line V—V of Fig. 4.
Figure 4:
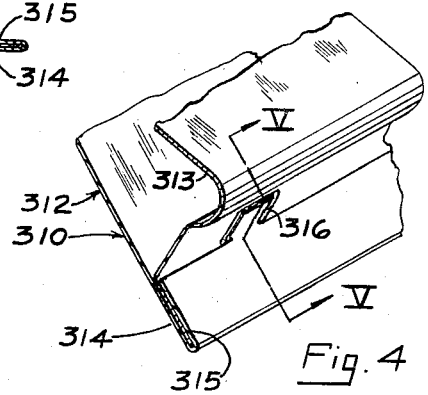
Fig. 4 is a fragmentary isometric sectional view of a deck lid which was fabricated by utilizing a modified form of the method of the present invention.

The modification of the invention illustrated in Figs. 4 and 5 is somewhat similar to the embodiment shown in Fig. 2. Reference numerals used for Figs. 4 and 5 are in the 300 series. Elements of the embodiment shown in Figs. 4 and 5 have reference numerals for which the last two digits are the same as reference numerals of generally corresponding elements in Fig. 2. In the embodiment of Figs. 4 and 5 the tongue 316 and the portion of panel 313 with which it is in abutting engagement extends in a generally normal direction relative to the external panel 312. With this construction the heat generated by welding tongue 316 to panel 313 is more efficiently dissipated than in the embodiments of the invention illustrated in Figs. 2, 3, and 4. A construction in which tongue 316 is extended in a direction normal to the external panel 312 may be used to good advantage where the extra lateral space required for this construction would not be objectionable.

It is contemplated within the scope of the invention that any one of a variety of welding processes, including soldering and brazing, may be utilized to join or attach the two panels which comprise the deck lid 10. Although a preferred way of joining the panels is by spot welding, other forms of welding processes may be utilized as will be apparent to men skilled in the welding art.

The method of the present invention may be utilized to attach together by welding various structures comprising two panels arranged in parallel spaced relation without marring or otherwise damaging a smoothly finished surface on one of the panels. Although three constructions are shown and described herein which were fabricated by utilizing the method of the present invention, other modified forms of such method may be utilized in the manufacture of other structures without departing from the spirit or essential characteristics thereof. The applications of the method of the present invention described herein are therefore to be considered in all respects as illustrative and not restrictive, the scope of the invention being indicated by the appended claims rather than by the foregoing description, and all changes which come within the meaning and range of equivalency of the claims are therefore intended to be embraced therein.

It is claimed and desired to secure by Letters Patent:

1. A method of welding together first and second panels of sheet metal in generally parallel spaced relation without marring or damaging a smoothly finished surface on said first panel, comprising the steps of providing tongue means at one end of said first panel and bending said first panel inwardly relative to the finished surface to form a U shaped cross section with said tongue means protruding from the inner leg of the U in parallel spaced relation to said first panel and offset relative to said inner leg in a direction away from said first panel, forming and positioning said second panel so that an end portion thereof is disposed between the legs of said U and another portion of said second panel is disposed in spaced relation to said first panel and in abutting engagement with said tongue means, and joining said second panel and said tongue means by welding to form a unitary structure.

2. A method of welding together first and second panels of sheet metal in generally parallel spaced relation without marring or damaging a smoothly finished surface on said first panel, comprising the steps of providing tongue means at one end of said first panel and bending said first panel inwardly relative to the finished surface to form a U shaped cross section with said tongue means protruding from the inner leg of the U in a direction normal to and away from said first panel, forming and positioning said second panel with an end portion thereof disposed between the legs of said U and another portion of said second panel is disposed in abutting engagement with said tongue means, and joining said second panel and said tongue means by welding to form a unitary structure.

3. A method of welding together first and second panels of sheet metal in generally parallel spaced relation without marring or damaging a smoothly finished surface on said first panel, comprising the steps of providing tongue means at one end of said first panel and bending said first panel inwardly relative to the finished surface to form a U shaped cross section with said tongue means protruding from the inner leg of the U, bending and positioning said tongue means relative to the inner leg of said U so that at least a portion of said tongue means is spaced a greater distance away from the finished surface of said first panel than is said inner leg of said U, and forming and positioning said second panel so that the end portion thereof is disposed between the legs of said U and another portion of said second panel is disposed in spaced relation to said first panel and in abutting engagement with said tongue means, and joining said second panel and said tongue means by welding to form a unitary structure.

References Cited in the file of this patent

UNITED STATES PATENTS

| | | |
|---|---|---|
| 1,268,980 | Krumholz | June 11, 1918 |
| 2,021,173 | Clark | Nov. 19, 1935 |